United States Patent
Bang

[11] Patent Number: 5,706,265
[45] Date of Patent: Jan. 6, 1998

[54] SPINDLE MOTOR DRIVING CONTROL CIRCUIT OF DISK DRIVE RECORDING DEVICE

[75] Inventor: Ho-Yul Bang, Suwon, Rep. of Korea

[73] Assignee: SamSung Electronics Co., Ltd., Suwon, Rep. of Korea

[21] Appl. No.: 570,561

[22] Filed: Dec. 11, 1995

[30] Foreign Application Priority Data

Apr. 27, 1995 [KR] Rep. of Korea .................. 10180/1995

[51] Int. Cl.$^6$ ...................................................... G11B 7/00
[52] U.S. Cl. ........................... 369/50; 369/47; 360/73.03
[58] Field of Search ......................... 369/50, 47, 44.26, 369/48, 54, 59; 360/73.01, 73.03, 73.12, 73.13, 74.5, 73.11, 51

[56] References Cited

U.S. PATENT DOCUMENTS

| | | | |
|---|---|---|---|
| 4,890,045 | 12/1989 | Ishizuka . | |
| 5,089,900 | 2/1992 | Yokogawa . | |
| 5,093,820 | 3/1992 | Maeda et al. | 369/50 |
| 5,270,992 | 12/1993 | Yasuda et al. . | |
| 5,278,814 | 1/1994 | Deguchi et al. | 369/50 |
| 5,289,448 | 2/1994 | Sato . | |
| 5,298,812 | 3/1994 | Bigge . | |
| 5,379,166 | 1/1995 | Tsukada et al. . | |
| 5,381,279 | 1/1995 | Dunn . | |
| 5,420,841 | 5/1995 | Hwang . | |
| 5,432,766 | 7/1995 | Ando et al. . | |
| 5,528,573 | 6/1996 | Shim | 369/50 |

Primary Examiner—Thang V. Tran
Attorney, Agent, or Firm—Robert E. Bushnell, Esq.

[57] ABSTRACT

A spindle motor driving control circuit in a disk drive recording device including a spindle motor for rotating a disk recording medium, a motor driving unit for controlling driving of the spindle motor, and a control unit for controlling the overall operation of the disk drive recording device. The circuit includes: a servo address mark (SAM) detecting unit for detecting a servo address mark (SAM) recording pattern from a signal read from the disk recording medium and generating a servo address mark (SAM) pulse corresponding to detection of the servo address mark (SAM) recording pattern; a first counting unit for starting a first counting operation and generating a first count value in response to the servo address mark (SAM) pulse; a first memory unit for storing a predetermined reference value provided from the control unit; a comparing unit for comparing the predetermined reference value with the first count value and generating an end of servo sector (ENDS) pulse when the two values are equal; a window length counting unit for starting a second counting operation and generating a second count value in response to the end of servo sector (ENDS) pulse, and terminating the second counting operation in response to the servo address mark (SAM) pulse; and an adding unit for generating an added value by adding the second count value to the predetermined reference value. The control unit controls the driving of the spindle motor based on the added value.

16 Claims, 3 Drawing Sheets

SPINDLE MOTOR DRIVING CONTROL CIRCUIT OF DISK DRIVE RECORDING DEVICE

CROSS-REFERENCE TO RELATED APPLICATIONS

This application makes reference to, incorporates the same herein, and claims all benefits accruing under 35 U.S.C. §119 from an application for *Spindle Motor Driving Control Circuit Of Disk Drive Recording Device* earlier filed in the Korean Industrial Property Office on 27 Apr. 1995 and there assigned Serial No. 10180/1995.

BACKGROUND OF THE INVENTION

The present invention relates to a disk drive recording device, and more particularly to a spindle motor driving control circuit for driving a disk recording medium.

Since disk drive recording devices, such as hard disk drives, are operating at increasingly high velocities and accommodate higher degrees of data storage capacity, the reliability of data read from and written onto the disk recording medium has become a key concern. As the rotating velocity of a spindle motor in the disk drive recording device has increased, (e.g. 3600 rpm→4500 rpm→5400 rpm, etc.), the structure of the spindle motor has changed and a spindle motor driving control circuit for maintaining stable performance of the Repeatable Run-Out (RRO) and Non-Repeatable Run-Out (NRRO) techniques has improved.

One prior art reference that controls operation of the spindle motor in a disk drive recording device is disclosed in U.S. Pat. No. 5,379,166 entitled *Magnetic Disk Drive Device* issued to Tsukada et al. on 3 Jan. 1995. In Tsukada et al. '166, specific data is detected at the time of starting the rotation of the magnetic disk, and the speed of the disk is measured on the basis of the data obtained. The spindle motor is thereby controlled to rotate at a constant speed. While conventional art, such as Tsukada et al. '166, has merit in its own right, I believe that an improved spindle motor control device can be contemplated wherein reliable data read and write operations can be consistently performed.

SUMMARY OF THE INVENTION

Accordingly, it is an object of the present invention to provide an improved spindle motor driving control circuit in a disk drive recording device.

It is another object to provide a spindle motor driving control circuit in a disk drive recording device that consistently provides a high degree of reliablity during data read and write operations.

It is still another object to provide a spindle motor driving control circuit capable of suppressing errors generated during reading and writing operations due to vibrations of the spindle motor in a disk drive recording device.

It is yet another object to provide a spindle motor driving control circuit in a disk drive recording device capable of controlling a spindle motor to rotate at a constant velocity.

To achieve these and other objects, the present invention provides a spindle motor driving control circuit in a disk drive recording device including a spindle motor for rotating a disk recording medium, a motor driving unit for controlling driving of the spindle motor, and a control unit for controlling the overall operation of the disk drive recording device. The circuit includes: a servo address mark (SAM) detecting unit for detecting a servo address mark (SAM) recording pattern from a signal read from the disk recording medium and generating a servo address mark (SAM) pulse corresponding to detection of the servo address mark (SAM) recording pattern; a first counting unit for starting a first counting operation and generating a first count value in response to the servo address mark (SAM) pulse; a first register for storing a predetermined reference value provided from the control unit; a comparing unit for comparing the predetermined reference value with the first count value and generating an end of servo sector (ENDS) pulse when the two values are equal; a window length counting unit for starting a second counting operation and generating a second count value in response to the end of servo sector (ENDS) pulse, and terminating the second counting operation in response to the servo address mark (SAM) pulse; and an adding unit for generating an added value by adding the second count value to the predetermined reference value. The control unit controls the driving of the spindle motor based on the added value.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
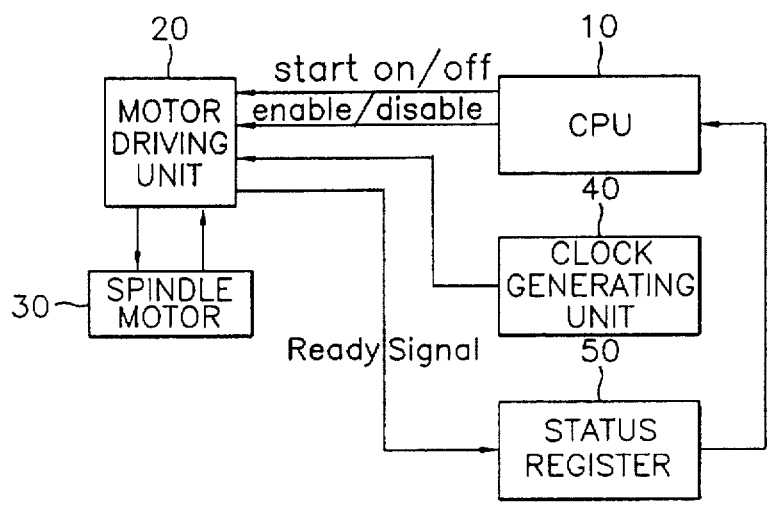
FIG. 1 is a block diagram illustrating a spindle motor driving control circuit of a conventional disk drive recording device.

Turning now to the drawings and referring to FIG. 1, a block diagram of a spindle motor driving control circuit in a conventional disk drive recording device is illustrated. FIG. 1 is comprised of a central processing unit (CPU) 10, a motor driving unit 20, a spindle motor 30, a clock generating unit 40, and a status register 50. The control process of the conventional disk drive recording device shown in FIG. 1 is as follows. First, when power is provided to the disk drive recording device, central processing unit (CPU) 10 transmits an enable signal to motor driving unit 20. Clock generating unit 40 generates a reference clock signal for determining a rotating velocity of spindle motor 30 (e.g., 3600 rpm, 4500 rpm, 5400 rpm, etc.) and provides the reference clock signal to motor driving unit 20. Then, when central processing unit (CPU) 10 transmits a start signal to motor driving unit 20, motor driving unit 20 drives spindle motor 30. When spindle motor 30 is rotating at a constant velocity, motor driving unit 20 outputs a ready signal to status register 50 in response to this sensed condition. Central processing unit (CPU) 10 then senses the ready signal indicating that spindle motor 30 has reached a constant velocity through status register 50, and accordingly performs a data reading or writing operation on the disk recording medium.

In the description above, when the rotating velocity of spindle motor 30 exceeds 3240 rpm (which corresponds to 90% of a prescribed rotating velocity of 3600 rpm), the conventional spindle motor driving control circuit generates the ready signal. Under these conditions, there is often a problem in that errors may be generated due to vibrations of spindle motor 30 while reading data from or writing data onto the disk recording medium due to vibrations of spindle motor 30. Furthermore, there is a disadvantage in that the deviation of a reference signal is too large for central processing unit (CPU) 10 to process the error information due to the vibrations of spindle motor 30.

Hereinafter, a detailed description of a preferred embodiment of the present invention will be provided with reference to the attached drawings.

Figure 2:
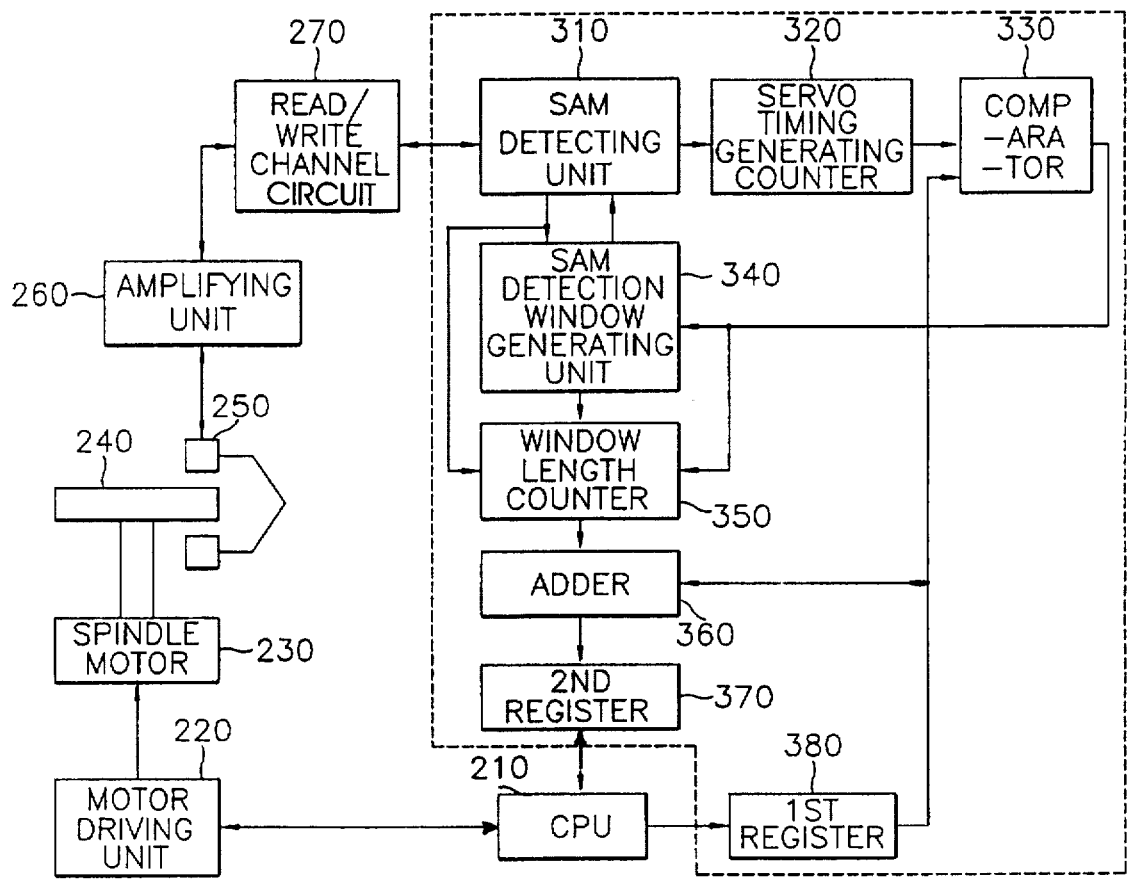
FIG. 2 is a block diagram illustrating portions of a disk drive recording device constructed according to a preferred embodiment of the present invention.

Referring now to FIG. 2, a block diagram of a portion of the disk drive recording device constructed according to a preferred embodiment of the present invention is shown. In FIG. 2, a central processing unit (CPU) 210 controls the general operation of the disk drive recording device. A spindle motor 230 is a rotary actuator and has a driving axis connected to rotate a disk 240, which acts as a recording medium. A motor driving unit 220 controls the driving of spindle motor 230 under the control of central processing unit (CPU) 210. A head 250 moves horizontally along the surface of disk 240 and reads and writes data thereon. An amplifying unit 260 is connected to head 250, and amplifies signals read from and written onto disk 240. A read/write channel circuit 270 receives input data to be written onto disk 240 and encodes the input data to produce an analog flux converting signal and thereby output an encoded signal to amplifying unit 260. Read/write channel circuit 270 also converts an analog reading signal provided from amplifying unit 260 into encoded read data (ERD). A servo address mark (SAM) detecting unit 310, which is connected to read/write channel circuit 270, receives the encoded read data (ERD) to detect a servo address mark (SAM) on disk 240, and generates and outputs a servo address mark (SAM) pulse corresponding to detection of the servo address mark (SAM). A servo timing generating counter 320 is connected to servo address mark (SAM) detecting unit 310, and starts a counting operation in response to the servo address mark (SAM) pulse to thereby output a first count value. A first register 380 temporarily stores a predetermined reference value provided from central processing unit (CPU) 210. The predetermined reference value represents a period from generation of the servo address mark (SAM) pulse to a middle portion of a synchronization (SYNC) signal of a next servo sector. A comparator 330 compares the reference value from first register 380 with the first count value provided from servo timing generating counter 320. When the predetermined reference value and the first count value are equal, comparator 330 generates and outputs an end of servo sector (ENDS) pulse. A servo address mark (SAM) detection window generating unit 340 is connected to comparator 330 and servo address mark (SAM) detecting unit 310. Servo address mark (SAM) detection window generating unit 340 generates a servo address mark (SAM) detection window signal and provides the servo address mark (SAM) detection window signal to servo address mark (SAM) detecting unit 310 in response to the end of servo sector (ENDS) pulse provided from comparator 330, and disables generation of the servo address mark (SAM) detection window signal in response to generation of the servo address mark (SAM) pulse by servo address mark (SAM) detecting unit 310. A window length counter 350 begins a counting operation in response to receipt of the end of servo sector (ENDS) signal from comparator 330 and outputs a second count value. Window length counter 350 terminates the counting operation in response to receipt of the servo address mark (SAM) pulse. An adder 360 receives the second count value provided from window length counter 350 and the reference value provided from first register 380, adds the two values and outputs an added value. A second register 370 receives and temporarily stores the added value provided from adder 360.

Figure 3:
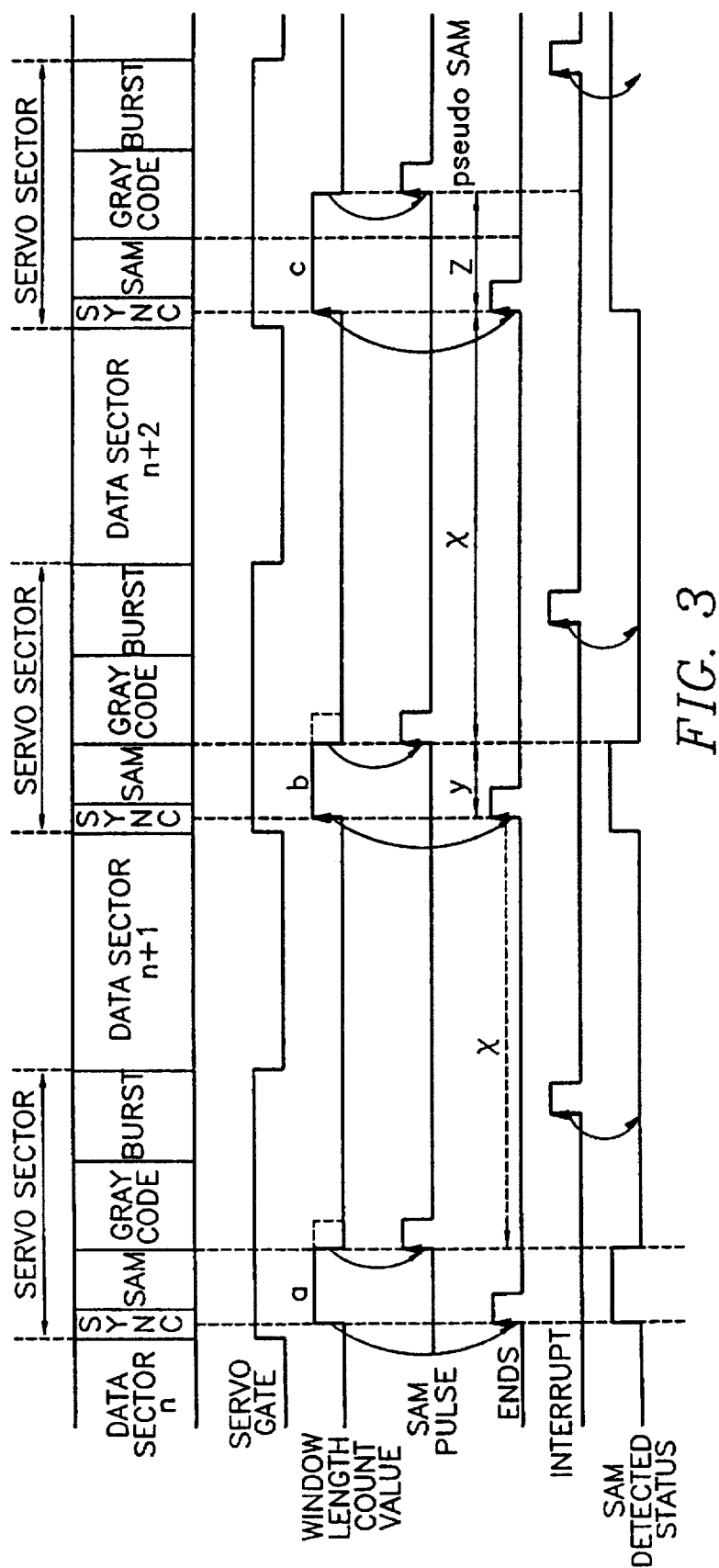
FIG. 3 is a timing diagram illustrating operations of components in FIG. 2.
Figure 4C:
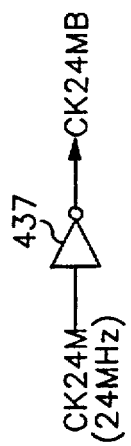
FIGS. 4A through 4C are detailed circuit diagrams illustrating the structures of the spindle motor driving control circuit in FIG. 2.
Figure 4B:
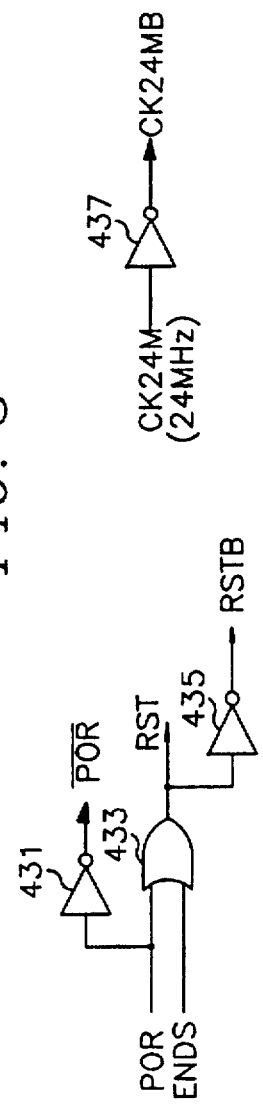
Figure 4A:
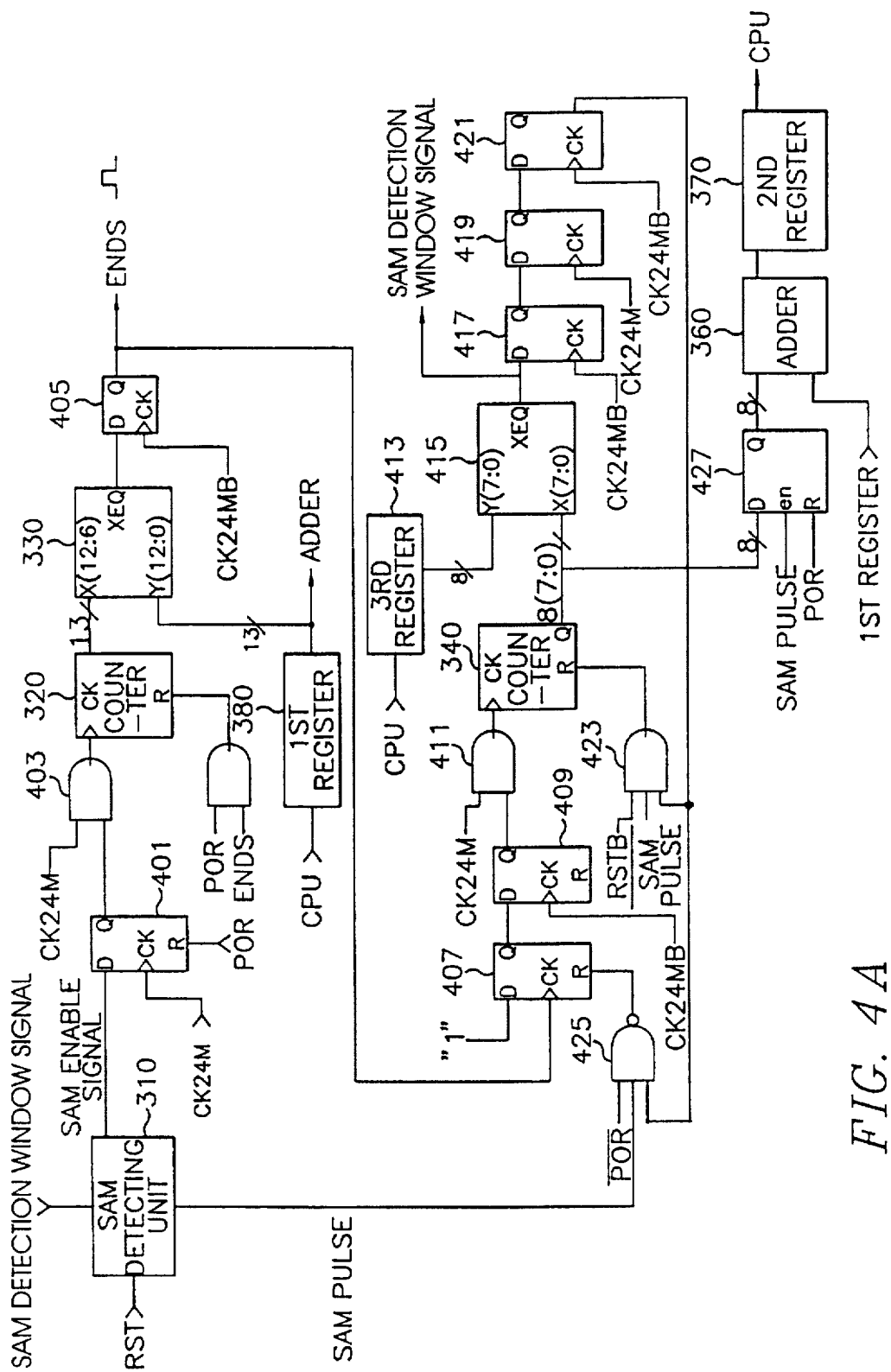

FIG. 3 is a timing diagram illustrating operations of the components of FIG. 2. As shown in FIG. 3, a servo sector on the disk recording medium is generally comprised of a synchronization (SYNC) section containing the synchronization (SYNC) signal, a servo address mark (SAM) section containing the servo address mark (SAM), gray code and a burst section. FIGS. 4A through 4C are detailed circuit diagrams illustrating the structure of the spindle motor driving control circuit of FIG. 2 described above. An explanation of a preferred embodiment of the present invention will now be described in detail with reference to FIGS. 2 through 4C.

First, after power is supplied to the disk drive recording device, central processing unit (CPU) 210 provides a motor enable signal to motor driving unit 220. Motor driving unit 220 then drives spindle motor 230 to a constant rotational velocity. When spindle motor 230 reaches a constant velocity, that is, a velocity that falls within a prescribed range, motor driving unit 220 generates a ready signal. According to an exemplary embodiment, the ready signal is generated when the rotational velocity of spindle motor 230 exceeds 90% of the prescribed rotational velocity. Upon generation, the ready signal is transmitted to second register 370. Central processing unit (CPU) 210 checks second register 370 at every interrupt.

Signals read from the servo sector of disk 240 via head 250 are then provided to read/write channel circuit 270 through amplifying unit 260. Next, the read signals are digitalized by an automatic gain controller (AGC; not shown), a differentiator (not shown) and a peak detector (not shown) within read/write channel circuit 270. Read/write channel circuit 270 then outputs encoded read data (ERD) to servo address mark (SAM) detecting unit 310. When a servo address mark (SAM) is detected from the encoded read data (ERD), servo address mark (SAM) detecting unit 310 generates a servo address mark (SAM) pulse, as shown in FIG. 3, and provides the servo address mark (SAM) pulse to servo timing counter 320 to thereby start the counting operation. Central processing unit (CPU) 210 loads, at the initial state, the prescribed reference value into first register 380. As stated above, the reference value represents a period from the generation of the servo address mark (SAM) pulse to a middle portion of the synchronization (SYNC) signal of a next servo sector. This period is shown as x in FIG. 3. Comparator 330 receives the first count value provided from servo timing generating counter 320 and the reference value provided from first register 380, and compares the two values. When the two values are equal, comparator 330 generates the end of servo sector (ENDS) pulse and provides the end of servo sector (ENDS) pulse to servo address mark (SAM) detecting window generating unit 340 and window length counter 350.

Servo address mark (SAM) detection window generating unit 340 provides the servo address mark (SAM) detection window signal to servo address mark (SAM) detecting unit 310 in response to the end of servo sector (ENDS) pulse. Servo address mark (SAM) detecting unit 310 is enabled by the servo address mark (SAM) detection window signal and responds by performing an operation for detecting the servo address mark (SAM) from the encoded read data (ERD) received from read/write channel circuit 270.

As servo address mark (SAM) detection window generating unit 340 generates the servo address mark (SAM) detection window signal in response to the end of servo sector (ENDS) pulse, window length counter 350 is enabled to begin the counting operation. Window length counter 350 terminates the counting operation in response to the servo address mark (SAM) pulse received from servo address mark (SAM) detecting unit 310. Adder 360 then adds the second count value provided from window length counter 350 and the reference value provided from first register 380, to thereby output the added value to second register 370. Accordingly, central processing unit (CPU) 210 accesses second register 370, and can thereby determine the cycle of the servo sector.

As an example, if the prescribed rotational velocity of the spindle motor is 5400 rpm, a vibration margin for the spindle motor can be obtained by the following equations.

That is, when the rotational velocity is 5400 rpm, one revolution occurs every 11.11 milliseconds (ms). Assuming that the number of servo sectors detected during one revolution is 72, one servo sector interval occurs during rotation every (11.11 ms)/(72)=154.3 microseconds (μs). Therefore, if the vibration tolerance of the spindle motor is determined to be +/−0.1%, this results in a margin equal to 154.3 μs +/−154.3 nanoseconds (ns). Moreover, assuming the clock frequency of the servo timing counter is 24 MHz, one clock cycle occurs every 41.6 ns. Consequently, the vibration margin (in terms of clock cycles) equals (154.3 ns)/(41.6 ns)=3.7 clock cycles≈+/−3 clock cycles.

The window length count value (which is the second count value mentioned above) as shown in FIG. 3 can have, for example, a, b and c values. The a and b values of FIG. 3 are both included within the vibration margin of the spindle motor, but when the c value (or z value) is read, central processing unit (CPU) 210 senses that the servo address mark (SAM) is missed (i.e., pseudo SAM) from an interrupt and therefore ignores the c value. Central processing unit (CPU) 210 generally includes the x+y value as shown in FIG. 3, by which the variation value of the vibration can be detected.

The operation of the preferred embodiment of the present invention will now be described in detail with reference to FIGS. 4A through 4C.

During an initial state, power is supplied to the disk drive recording device and a power on reset (POR) signal is provided to servo address mark (SAM) detecting unit 310. Servo address mark (SAM) detecting unit 310 is enabled by the servo address mark (SAM) detection window signal to detect the servo address mark (SAM), and output a servo address mark (SAM) enable signal corresponding to the detected servo address mark (SAM) to a first D flip-flop 401. First D flip-flop 401 then transmits a logic "high" signal to a first AND gate 403 during an input interval of the servo address mark (SAM) enable signal. First AND gate 403, which has received the logic "high" signal, also receives a 24 MHz clock signal (CK24M) to thereby output a clock signal to a clock terminal of servo timing generating counter 320, which acts as a 13-bit counter. Servo timing generating counter 320 counts the clock signals (CK24M) to thereby output the first count value to comparator 330.

Comparator 330 receives the first count value from servo timing generating counter 320 and the reference value from first register 380, and compares the two values. If the two values are equal, comparator 330 outputs a logic "high" signal from an XEQ output terminal. A second flip-flop 405 receives the logic "high" signal from comparator 330 in synchronization with an inverse clock signal (CK24MB), and outputs the synchronized signal as the end of servo sector (ENDS) pulse. The inverse dock signal (CK24MB) can be generated by inverting the clock signal (CK24M) through an inverter 437, as shown in FIG. 4C. The end of servo sector (ENDS) pulse resets servo timing generating counter 320 and servo address mark (SAM) detecting unit 310, and is provided to the clock terminal of a third D flip-flop 407. An inverse power on reset signal (/POR), a reset signal (RST) and an inverse reset signal (RSTB) can be generated from the power on reset (POR) signal and the end of servo sector (ENDS) pulse by using an inverter 431, an OR gate 433, and an inverter 435, as shown in FIG. 4B.

A logic "high" signal output from third D flip-flop 407 is synchronized with the inverse clock signal (CK24MB) in a fourth D flip-flop 409 and is output to a second AND gate 411. Second AND gate 411 receives the latch-output from fourth D flip-flop 409 and the clock signal CK24M and performs a logical AND operation on the two signals. Servo address mark (SAM) detection window generating unit 340, which operates as an 8-bit counter, receives the output from second AND gate 411 at a clock terminal.

Central processing unit (CPU) 210 enables a given reference count value, which represents the length of the servo address mark (SAM) detection window, to be input to a window length comparator 415 through a third register 413 to control the servo address mark (SAM) window length. Window length comparator 415 compares the reference count value with the count value provided from servo address mark (SAM) detection generating unit 340. If the two values are equal, window length comparator 415 outputs a logic "high" signal to a fifth D flip-flop 417. The output from window length comparator 415 is synchronized with the inverse clock signal (CK24MB) in fifth D flip-flop 417. Next, the latched output from fifth D flip-flop 417 is synchronized with the dock signal (CK24M) and the inverse dock signal (CK24MB) in a sixth D flip-flop 419 and a seventh D flip-flop 421, respectively. The output from seventh D flip-flop 421 is provided to a third AND gate 423 where it is logically ANDed with an inverse servo address mark (/SAM) pulse and the inverse reset signal (RSTB). The output from third AND gate 423 is then provided to a reset terminal of servo address mark (SAM) detection window generating unit 340. Moreover, the output from seventh D flip-flop 421 resets third D flip-flop 407 through fourth AND gate 425 to stand-by for the next end of servo sector (ENDS) pulse.

Additionally, the count value from servo address mark (SAM) detection window generating unit 340 is latched in an eighth D flip-flop 427 to thereby be provided to adder 360 in accordance with the servo address mark (SAM) pulse. Adder 360 adds the reference value provided from first register 380 and the latch-output from eighth D flip-flop 427 to thereby output the added value to second register 370.

Finally, central processing unit (CPU) 210 accesses second register 370 and senses the cycle of the servo sector and the velocity of spindle motor 230 based on the added value. Central processing unit (CPU) 210 determines whether a read or write operation is possible based on the sensed velocity of spindle motor 230, and accordingly controls the rotational velocity of spindle motor 230.

As described above, the present invention has an advantage in that the spindle motor can be controlled to rotate at a constant velocity by precisely sensing the range of errors of the motor driving unit generated while rotating the recording disk at a high velocity, and enhance the reliability of the reference signal for determining whether or not the spindle motor rotates at the constant velocity. Furthermore, there is an advantage of enhanced reliability of data in the disk drive recording device rotating at a high velocity by precisely compensating for vibrations by using the digitalized encoded read data (ERD) read out through the head.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A spindle motor driving control circuit in a disk drive recording device, comprising:
    reading means for reading electrical signals from a surface of a disk recording medium rotated by said spindle motor;
    encoded read data generating means for generating encoded read data from said electrical signals read from said surface of said disk recording medium;
    servo address mark detecting means for detecting a servo address mark from said encoded read data and generating a servo address mark pulse in response to detection of said servo address mark;
    first counting means for beginning a first counting operation in response to generation of said servo address mark pulse to generate a first count value;
    comparing means for comparing said first count value with a predetermined reference value and generating an end of servo sector pulse when said first count value equals said predetermined reference value;
    second counting means for beginning a second counting operation in response to generation of said end of servo sector pulse to generate a second count value;
    adding means for adding said second count value to said predetermined reference value to generate an added value; and
    control means for sensing a velocity exhibited by said spindle motor based on said added value, determining whether a reading or writing operation is possible based on said velocity exhibited by said spindle motor, and controlling driving of said spindle motor.

2. The spindle motor driving control circuit as claimed in claim 1, wherein said predetermined reference value represents a first period extending from said servo address mark pulse of a present servo sector to a middle portion of a synchronous signal of a next servo sector.

3. The spindle motor driving control circuit as claimed in claim 2, wherein said second count value represents a second period extending from said middle portion of said synchronous signal of said next sector to said servo address mark pulse of said next servo sector.

4. The spindle motor driving control circuit as claimed in claim 3, wherein said added value represents a third period comprised of a single servo sector and a single data sector.

5. A spindle motor driving control circuit in a disk drive recording device including a spindle motor for rotating a disk recording medium, a motor driving unit for controlling driving of said spindle motor, and control means for controlling an overall operation of said disk drive recording device, said circuit comprising:
    servo address mark detecting means for detecting a servo address mark recording pattern from a signal read from said disk recording medium and generating a servo address mark pulse corresponding to detection of said servo address mark recording pattern;
    first counting means for starting a first counting operation in response to said servo address mark pulse and providing output of a first count value;
    comparing means for comparing a predetermined reference value with said first count value and generating an end of servo sector pulse when said predetermined reference value equals said first count value;
    window length counting means for starting a second counting operation in response to said end of servo sector pulse and providing output of a second count value, said window length counting means terminating said second counting operation in response to said servo address mark pulse;
    adding means for generating an added value by adding said second count value to said predetermined reference value; and
    said control means receiving said added value, and controlling said motor driving unit to control the driving of said spindle motor based on said added value.

6. The spindle motor driving control circuit as claimed in claim 5, wherein said predetermined reference value represents a first period extending from said servo address mark pulse of a present servo sector to a middle portion of a synchronous signal of a next servo sector.

7. The spindle motor driving control circuit as claimed in claim 6, wherein said second count value represents a second period extending from said middle portion of said synchronous signal of said next sector to said servo address mark pulse of said next servo sector.

8. The spindle motor driving control circuit as claimed in claim 7, wherein said added value represents a third period comprised of a single servo sector and a single data sector.

9. A method for controlling a spindle motor in a disk drive recording device, comprising the steps of:
    reading electrical signals from a surface of a disk recording medium rotated by said spindle motor;
    generating encoded read data from said electrical signals read from said surface of said disk recording medium;
    detecting a servo address mark from said encoded read data and generating a servo address mark pulse in response to detection of said servo address mark;
    beginning a first counting operation in response to generation of said servo address mark pulse to generate a first count value;
    comparing said fast count value with a predetermined reference value and generating an end of servo sector pulse when said first count value equals said predetermined reference value;
    beginning a second counting operation in response to generation of said end of servo sector pulse to generate a second count value;
    adding said second count value to said predetermined reference value to generate an added value; and
    controlling said spindle motor in dependence upon said added value.

10. The method as claimed in claim 9, wherein said predetermined reference value represents a first period extending from said servo address mark pulse of a present servo sector to a middle portion of a synchronous signal of a next servo sector.

11. The method as claimed in claim 10, wherein said second count value represents a second period extending from said middle portion of said synchronous signal of said next sector to said servo address mark pulse of said next servo sector.

12. The method as claimed in claim 11, wherein said added value represents a third period comprised of a single servo sector and a single data sector.

13. The method as claimed in claim 9, wherein said step of detecting said servo address mark from said encoded read data is performed in response to a servo address mark detection window signal generated in response to said end of servo sector pulse.

14. The method as claimed in claim 12, wherein said step of detecting said servo address mark from said encoded read data is performed in response to a servo address mark detection window signal generated in response to said end of servo sector pulse.

15. A method for controlling a spindle motor in a disk drive recording device, comprising the steps of:

reading a servo address mark recording pattern from electrical signals from a surface of a disk recording medium rotated by said spindle motor;

generating encoded read data from said electrical signals read from said surface of said disk recording medium;

making a first count of clock signals during a period started in response to detection of a servo address mark within said encoded read data and terminating said first count when said first count is equal in value to a reference value;

making a second count of said clock signals during a window interval started upon termination of said first count and terminating said second count in response to detection of a subsequent said servo address mark within said encoded read data;

generating an added value by adding said second count to said reference value;

sensing a velocity of said spindle motor by using said added value; and performing reading and writing of information on said disk and controlling driving of said spindle motor based on said velocity.

16. The method of claim 15, further comprising the steps of:

generating a serial plurality of said added values;

determining a margin of vibration of said disk; and performing said reading and writing of information on a basis of whether corresponding ones of said added values are within said margin of vibration.

* * * * *